United States Patent [19]

Brunken et al.

[11] Patent Number: 5,120,581

[45] Date of Patent: Jun. 9, 1992

[54] METHOD FOR REDUCING THE COMBUSTIBILITY OF COMBUSTIBLE MATERIALS

[75] Inventors: Dean E. Brunken, Edmond; Arnulf P. Hagen, Norman, both of Okla.

[73] Assignee: Advanced Chemical Technologies, Co., Oklahoma City, Okla.

[21] Appl. No.: 610,862

[22] Filed: Nov. 8, 1990

Related U.S. Application Data

[63] Continuation-in-part of Ser. No. 421,176, Oct. 13, 1989, abandoned.

[51] Int. Cl.⁵ .............................................. B05D 3/02
[52] U.S. Cl. .............................. 427/387; 427/393; 427/393.3; 427/440; 428/447; 428/452; 428/921
[58] Field of Search ............. 427/387, 389, 393.3, 427/393, 440; 428/447, 448, 452, 537.1, 537.5, 920, 921

[56] References Cited

U.S. PATENT DOCUMENTS

| | | | |
|---|---|---|---|
| 4,152,481 | 5/1979 | Swihart | 428/264 |
| 4,187,346 | 2/1980 | Jarrett | 428/342 |
| 4,273,691 | 6/1981 | MacLaury et al. | 260/23 S |
| 4,348,306 | 9/1982 | Mischutin | 252/608 |
| 4,387,176 | 6/1983 | Frye | 524/268 |
| 4,419,402 | 12/1983 | Gutek | 428/266 |
| 4,423,112 | 12/1983 | Luthringshauser | 428/389 |
| 4,784,918 | 11/1988 | Klett et al. | 428/447 |
| 4,931,319 | 6/1990 | Stout et al. | 427/421 |
| 4,960,615 | 10/1990 | Stout et al. | 427/160 |

Primary Examiner—Michael Lusignan
Attorney, Agent, or Firm—Dunlap, Codding & Lee

[57] ABSTRACT

A method for reducing the combustibility of a compatible combustible material comprising treating the material with a fire retardant composition comprising a silane and/or siloxane. The silane and/or siloxane comprises a silicon moiety, a group having fire retardant properties and a group capable of permitting chemical attachement of the composition to the material. A catalyst may be added to the composition to increase the rate of the chemical attachment of the composition to the material. The material is treated with this composition producing a fire retardant article. The composition also imparts water resistance to the treated material.

55 Claims, No Drawings

METHOD FOR REDUCING THE COMBUSTIBILITY OF COMBUSTIBLE MATERIALS

CROSS REFERENCE TO RELATED APPLICATION

This application is a continuation-in-part of U.S. Ser. No. 07/421,176, entitled METHOD FOR REDUCING THE COMBUSTIBILITY OF COMBUSTIBLE MATERIALS, filed Oct. 13, 1989, now abandoned. This application is hereby incorporated by reference.

FIELD OF THE INVENTION

The present invention relates generally to methods for reducing the combustibility of compatible combustible materials by treating the compatible combustible material with a fire retardant composition which chemically attaches to the material. This fire retardant composition also imparts water resistance to the compatible combustible material.

SUMMARY OF THE INVENTION

A method for reducing the combustibility and increasing the water resistance of a compatible combustible material comprising treating the compatible combustible material with an effective amount of a fire retardant composition. The fire retardant composition comprises a silane or a siloxane or combination thereof. The silane has the general formula:

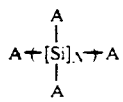

and the siloxane has the general formula:

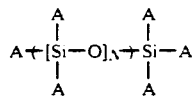

wherein Si is silicon; O is oxygen; n is a positive integer; and A is selected from the group consisting of H, R, X, Y, Q or D. H is a hydrogen atom, with the proviso that at least one A is X and at least one A is selected from the group of Y, Q or D.

R is selected from the group consisting of an alkyl group containing from about 1 to about 30 carbon atoms, an alkenyl group, an aryl group, a cycloalkyl group, a cycloalkenyl group, an arylalkyl group, an arylalkenyl group, or any substituted group thereof wherein the cyclo substituent contains from about 4 to about 8 carbon atoms, the alkyl substituent contains from 1 to about 8 carbon atoms and the alkenyl substituent contains up to about 8 carbon atoms.

X is selected from a group consisting of a halogen, hydroxyl group, RO group wherein 0 is oxygen, RNR or RNH wherein N is nitrogen, or carboxylic group.

Y is selected from the group consisting of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms. Y is substituted with at least one bromine atom or at least one iodine atom.

Q is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms. Q is substituted with at least one $-EH_xR_b$ group, wherein when $x+b=1$, then E is $(E)_m$ wherein m is an integer of 1-5 and E is sulfur or selenium, when $x+b=2$, then E is aluminum, phosphorus or arsenic, and when $x+b=3$, then E is silicon, germanium, or tin.

D is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms. D is substituted with at least one moiety comprising an element capable of forming a covalent bond with carbon having an average bond energy of 72 kcal/mol or less.

The present invention also comprises a fire retardant and water resistant article comprising compatible combustible material comprising a effective amount of the composition previously described capable of reducing the combustibility of the material.

DETAILED DESCRIPTION OF THE PRESENT INVENTION

The present invention comprises methods for reducing the combustibility and increasing the water resistance of a compatible combustible material by treating the compatible combustible material with a fire retardant composition. "Compatible combustible material" as used herein means a material capable of burning in air, and to which the composition of the present invention will chemically attach thereto. Some examples of compatible combustible materials utilized in accordance with the present invention are cellulose containing materials; leather containing products such as shoes, boots, and protective apparel; and wool and other natural fibers. Examples of cellulose containing materials include wood, wicker, paper and fibers containing cellulose such as cotton and cotton blends. The present invention may be of particular use for articles such as building materials like wood shingles, construction lumber, railroad ties, paper books and toys, and cotton clothing. "Article" means any natural or manufactured item comprising compatible combustible material.

Preferably, the composition of the present invention comprises a silane or a siloxane or combinations thereof. The silane is represented by the general formula:

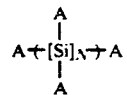

and the siloxane has the general formula:

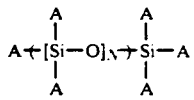

wherein Si is silicon; O is oxygen; n is a positive integer; and A is selected from the group consisting of H, R, X, Y, Q or D.

The repeating A group on the formula shown above, that is the A group attached to the silicon atom within the bracket when n is greater than 1, may repeat the H, R, X, Y, Q or D groups in any order. For example, when n=3, the formula becomes (using A' and A'''to designate the repeating A groups):

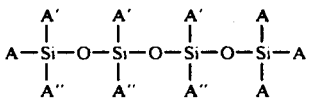

In the composition of the present invention all of the A's do not have to be the same group and all of the A''s do not have to be the same group, but are selected from the group comprising H, R, X, Y, Q or D groups in any order.

H is a hydrogen atom. R may comprise an alkyl group preferably containing from about 1 to about 30 carbon atoms, and more preferably from 1 to about 12 carbon atoms; R may also comprise the following groups: an alkenyl group, an aryl group, a cycloalkyl group, a cycloalkenyl group, an arylalkyl group, and an arylalkenyl group. The foregoing R groups may also comprise various substituents on the groups.

The composition of the present invention must have at least one attachment group which chemically attaches the composition to the compatible combustible material. The attachment group in the composition of the present invention is designated as X. X comprises a halogen, hydroxyl, a carboxylic acid group, an OR group, or RNR or RNH wherein N is nitrogen, 0 is oxygen and R is as previously described.

The attachment group of the composition of the present invention provides an advantage over other fire retardant compositions. Other known fire retardant compositions have carbon-bromine linkages, silicone polymers with carbon-bromine linkages, and phosphorus salts added to combustible materials. The present invention is an improvement in the use of these chemical elements and is fundamentally different since attachment groups (defined as "X" herein) chemically react with bonds in the compatible combustible material to form covalent linkages. An example would be the reaction:

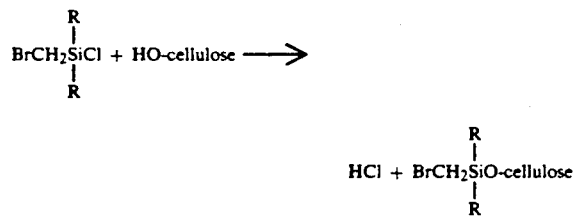

in which the silicon containing grouping becomes attached to the cellulose via a covalent bond.

A second example would be:

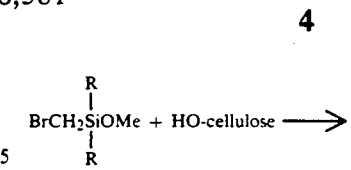

in which methanol is liberated. In these examples and in this invention, the active fire retardant moiety, $BrCH_2-$, becomes attached to the compatible combustible material via an SiO linkage. In the present invention, the fire retardant grouping is not a part of nor attached to an X-group since during the attachment process X no longer remains with the compatible combustible material.

With wood, the treatment penetrates into the wood and provides an extensive treatment depth. This is an improvement over silicone or organopolymer compositions which simply coat the surface of a compatible combustible material since the coating may flake off, wear off, or leach off in rain or during cleaning. Therefore, also the present invention is an improvement over salts that are used to saturate wood items such as shingles since the salts leach during rain storms or during cleaning of the wood surface.

The composition of the present invention must also comprise at least one fire retardant moiety. In the present invention, it is believed that the fire retardant moiety of the composition may work by releasing at least a portion of the fire retardant moiety from the composition, e.g., a Br or $(C_6H_5)_2P$, as a free radical in order to combine with free radicals in the fire to retard the propagation or initiation of a fire or to extinguish the fire.

In order to release the free radicals from the fire retardant moiety of the composition in the composition as described herein, the average bond energy between a carbon atom within the fire retardant moiety and the moiety attached thereto capable of becoming the free radical should be about 72 kcal/mol or less. Accordingly, preferably the fire retardant moiety may be selected from a group of elements capable of forming a covalent bond with carbon with an average bond energy of about 72 kcal/mol or less. Some examples of these elements are silicon, phosphorus, sulfur, germanium, arsenic, selenium, bromine, tin, iodine, and lead. Standard references in this field may be referred to in order to determine the average bonding energy between carbon and the groups utilized in accordance with the present invention not listed herein.

Therefore, the fire retardant moiety of the present invention is any moiety having at least one carbon atom capable of attaching to the silicon atom of the silane or siloxane formula previously described, and a substituent attached to a carbon within the fire retardant moiety capable of becoming a free radical when exposed to conditions conducive to burning of the compatible combustible material. Examples of fire retardant moieties in accordance with the present invention are described hereafter as groups Y, D and Q.

Y is selected from a group consisting of an alkyl group containing from 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein Y is substituted with at least one bromine atom substituent or at least one iodine atom substituent. A preferred Y would be the 1,2-dibromoethyl ($BrCH_2CHBr—$) grouping.

Q is selected from a group consisting of an alkyl group containing from 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein Q is substituted with at least one $-EH_xR_b$ group substituent, wherein when $x+b=1$, then E is $(E)_m$, wherein m is an integer of 1–5 and E is sulfur or selenium, when $x+b2$, then E is aluminum, phosphorus, or arsenic, and when $x+b=3$ then E is silicon, germanium, or tin. A preferred Q would have a sulfur substituent of the type $—SR$ or a phosphorus substituent of the type $—EH_xR_r$ where $x+r$ 2. More preferably Q would include a 4-phenylthiobutyl grouping or the 2-(diphenylphosphino)ethyl grouping.

D is selected from a group consisting of an alkyl group containing from 1 to about 30 carbon atoms, an alkenyl group, an aryl group, a cycloalkenyl group, an arylalkyl group, an arylalkenyl group, or any substituted group thereof wherein the cyclo substituent contains from about 4 to 8 carbon atoms, the alkyl substituent contains from 1 to about 8 carbon atoms, wherein D is substituted with at least one substituent comprising an element capable of forming a covalent bond with carbon having an average bond energy of 72 kcal/mol or less.

The groupings described as Q or D may comprise substituents such as $—SSR$ or $—SiHRSiR_2$ or other multi E groupings. The fire retardant composition of the present invention may have one or more E elements, R groups, Y groups, Q groups, or D groups. The addition of more than one E, R, Y, Q or D group to the composition of the present invention could have a synergistic effect to enhance fire retardant properties.

The composition of the present invention preferably comprises a silane and/or siloxane as descrbed herein in a medium. "Medium" means any type of vehicle which permits the application of the composition to the compatible combustible material and permits the composition to substantially retain its fire retardant properties. The medium preferably dissolves, suspends, or emulsifies the composition or portions of the composition in water or gases or solutions. The medium may be inert or react with the composition so long as the composition performs as described herein. Examples of suitable mediums are aqueous solutions, suspensions or emulsions; hydrocarbons; or alcohols. Preferred mediums used in accordance with the present invention are water, isopropyl alcohol, methanol, toluene or 1,1,1-trichloroethane. However, the present invention is not to be limited to any particular medium and may be utilized without any medium.

If the composition further comprises a medium, the silane and/or siloxane is present in the composition in any effective amount that will impart fire retardant properties to the compatible combustible material. Preferably the silane and/or siloxane is present in the composition from about 1% to about 50% by weight of the composition, and more preferably from abut 5% to about 40%.

The compatible combustible material is treated with the composition by contacting the material with the composition and preferably by immersion of the material into the composition. The composition may be applied to the material by spraying, brushing or rolling the composition onto the material. The composition of the present invention is applied to the material in vacuo (less than atmospheric pressure), at atmospheric pressure, or greater than atmospheric pressure. A better penetration of the composition into the material is achieved by applying the composition to the material at pressures less than or greater than atmospheric pressure. Greater penetration of the composition into the material may increase the fire retardant properties and/or the duration of the fire retardant properties of the material. "Fire retardant properties" means that burning of the treated material will not occur, will occur to a lesser degree, or be limited to a smaller area when compared to the untreated material.

The type of treatment will, in part, depend upon the type and size of the material, the extent of exposure of the material to the weather, the degree of fire retardant properties sought, and the duration of the fire retardant activity of the composition sought in the treated material. For example, with thin materials that are not exposed to weather conditions, brushing the composition on the material may suffice. Or if the material is highly susceptible to fire conditions and is exposed to weather conditions such as wood shingles, a greater degree of penetration of the composition into the material may be sought in order to enhance the fire retardant properties of the treated material. This greater degree of penetration may be achieved by contacting the material with the composition for a longer period of time, treating the material with the composition under pressure exceeding atmospheric pressure such as treating the material in a pressurized chamber or pressurized spraying of the material with the composition or by treating the material in a vacuum. Treating the material with a sufficient amount of pressure in the present invention is that amount of pressure (above or below atmospheric pressure) which will provide the appropriate amount of penetration into the material to provide the type of fire retardant properties desired.

Depending upon the density and/or porosity of the material, the factors cited herein, and the concentration of the composition, the application rate may be as high as 400 square feet per gallon or as low as 50 square feet per gallon. For example, rough cedar can be effectively treated with about 10% silane and/or siloxane solution of the present invention in a medium of isopropanol by spraying the solution on the surface at the rate of about 250 square feet per gallon. However, the application rates may vary widely with, among other things, the concentration of the composition in the medium, if a medium is used, therefore, the present invention is not limited to the foregoing application rates.

The composition of the present invention when applied to the material attaches to the compatible combustible material. Preferably this is a chemical attachment such as a chemical bonding between the composition and the material. One of the advantages of the present invention is that the chemical attachment of the composition to the material permits the composition to remain attached to the material for longer periods of time especially under conditions such as exposure to weather conditions which promotes leaching of the composition from the material.

A catalyst may be added to the composition of the present invention in order to increase the rate of reaction of chemical bonding of the composition to the compatible combustible material. Any catalyst may be utilized in accordance with the present invention which increases the rate of the chemical attachment of the composition to the material. Preferably the catalysts are transesterification or esterification catalysts, and more preferably, a soluble-metal catalyst such as a metal carboxylate, a metal alkoxide, or an organometallic alkoxide. Examples of suitable catalysts are zinc octoate, titanium acetylacetonate, dibutyl tin dilaurate, and combinations thereof. The catalyst may also be useful in decreasing the amount of the silane and/or siloxanes necessary in the composition which can decrease the cost of the composition.

The catalyst is present in the composition in a range from less than about one-tenth of one percent (0.1%) to about twenty-five percent (25%) by weight of the silane, siloxane or combination thereof, and more preferably from less than about one-tenth of one percent (0.1%) to about five percent (5%). Further, the silane, siloxane or combination thereof is present in the composition in an amount in a range from less than about one percent (1%) to less than about fifty percent (50%) by weight of the composition, and more preferably from about less than five percent (5%) to less than about forty percent (40%). Solutions containing about twelve percent (12%) by weight of the silane, siloxane or combinations thereof have been found to be effective for treating compatible combustible materials in accordance with the present invention.

In the following examples, the penetration of the attached fire retardant composition into piece of cedar wood was observed by cutting the wood and then sprinkling the cross section with water. The treated surface region caused the water to bead and also the untreated surface region was wetted by the water. Besides determining the depth of penetration of the composition, this demonstrated the water resistance properties imparted by the composition of the present invention. Compatible combustible materials, such as fences, decks or wood shingles, are often exposed to water. This exposure "weathers" or "ages" the materials thereby reducing the effective functional life of the material. By making the material both water resistant and fire resistant in one step, the life of the material is prolonged and the material is protected from fire.

The following examples illustrate the practice of the present invention. However, the present invention is not limited to these examples.

EXAMPLE 1

A solution of 1,2-dibromoethyltrimethoxysilane in isopropanol comprising 12% 1,2-dibromoethyltrimethoxysilane and 88% isopropanol and 2-4 drops titantium acetylacetonate dialkoxide in alcohol was prepared. The 1,2-dibromoethyl-trimethoxysilane was obtained by the reaction of elemental bromine, $Br_2$, with vinyltrimethoxysilane. The synthesis was performed by cooling the borosilicate glass reaction flask which held the vinyltrimethoxysilane at 0° C. and then adding the bromine dropwise while shining light from a photoflood lamp onto the reaction vessel. Excess starting material was removed by vacuum distillation at 11-14 mmHg pressure and the remaining material used in the tests. Into this solution, a piece of cedar wood 10 mm × 10 mm × 100 mm was placed and allowed to stand at atmospheric or greater pressure. The wood piece was removed from the treatment solution and air dried for 24 hours. The piece was cut and visually checked for penetration and then ignited with a wooden match. In all cases the treated wood charred; however, when the match was removed, the test piece stopped burning. The char was scraped from the surface and the sample reignited with a wood match. Referring to Table ', test samples 1-6 remained burning after the match was removed since the fire retardant layer had been scrapped away and test samples 7-10 stopped burning since a protective layer remained. An untreated control sample continued burning after the initial ignition.

TABLE 1

| | Experimental Summary and Results | | | |
|---|---|---|---|---|
| Sample | Concentration (% weight of silane/siloxane in isopropanol) | Time (hr) | Pressure (gauge) (psi) | Penetration (mm) |
| 1 | 14 | 0.2 | 0 | 0.5 |
| 2 | 18 | 0.2 | 0 | 0.5 |
| 3 | 22 | 0.2 | 0 | 0.5 |
| 4 | 36 | 0.2 | 0 | 1.5 |
| 5 | 44 | 0.2 | 0 | 1.5 |
| 6 | 46 | 72 | 0 | 1.5 |
| 7 | 12 | 24 | 25 | 3.0 |
| 8 | 18 | 24 | 25 | 3.0 |
| 9 | 19 | 24 | 25 | 4.0 |
| 10 | 28 | 24 | 25 | 4.0 |

EXAMPLE 2

A solution of 1,3,3-tribromopropyltrimethoxysilane (TRBPTMS) in isopropanol comprising 12% TRBPTMS and 88% isopropanol and 2-4 drops titanium acetylacetonate dialkoxide was prepared. The TRBPTMS was synthesized by combining bromoform and vinyltrimethoxysilane in a borosilicate flask and then adding 1-2 molar % benzoylperoxide as a catalyst. Excess volatile material was removed in vacuo at 1-2 mmHg pressure and the remaining material tested.

The same procedure described in Example 1 was followed with cedar wood and the following results were obtained:

TABLE 2

| | Experimental Summary and Results | | | |
|---|---|---|---|---|
| Sample | Concentration (% weight of silane/siloxane in isopropanol) | Time (hr) | Pressure (gauge) (psi) | Penetration (mm) |
| 1 | 12 | 24 | 25 | 3.0 |
| 2 | 18 | 24 | 25 | 4.0 |
| 3 | 28 | 24 | 25 | 4.0 |

EXAMPLE 3

A solution of 1,3,3,3-tetrabromopropyltrimethoxysilane (TEBPTMS) in isopropanol comprising 12% TEBPTMS and 88% isopropanol and 2-4 drops titanium acetylacetonate dialkoxide was prepared. The TEBPTMS was synthesized by combining carbontetrabromide and vinyltrimethoxysilane in a borosilicate flask and then adding 1-2 molar % azodiisobutryonitrile as a catalyst. Excess volatile material was removed in vacuo at 1-2 mmHg pressure and the remaining material tested.

The same procedure described in Example 1 was followed with cedar wood and the following results were obtained:

TABLE 3

Experimental Summary and Results

| Sample | Concentration (% weight of silane/siloxane in isopropanol) | Time (hr) | Pressure (gauge) (psi) | Penetration (mm) |
|---|---|---|---|---|
| 1 | 12 | 24 | 25 | 3.0 |
| 2 | 18 | 24 | 25 | 4.0 |
| 3 | 28 | 24 | 25 | 4.0 |

EXAMPLE 4

A solution of 2-(diphenylphosphino)ethyltrimethoxysilane (DPETMS) in isopropanol comprising 12% DPETMS and 88% isopropanol and 2-4 drops titanium acetylacetonate dialkoxide in alcohol was prepared. The DPETMS was synthesized by combining diphenylphosphine and vinyltrimethoxysilane in a borosilicate flask and then exposing to sunlight for 100 hours, or by using t-butylperoxide or azodiisobutryronitrile as a catalyst. Excess volatile material was removed in vacuo at 1-2 mmHg pressure and the remaining material tested.

The same procedure described in Example 1 was followed with cedar wood and the same results were obtained for treated wood as in Samples 7-10 in Table 1.

EXAMPLE 5

A solution of (4-phenylthiobutyl)trimethoxysilane (PTBTMS) in isopropanol comprising 12% PTBTMS and 88% isopropanol and 2-4 drops of titanium acetylactetonate dialkoxide in alcohol was prepared. The PTBTMS was synthesized from a mixture of benzyl mercaptan, sodium metal, and (3-chloropropyl)trimethoxysilane in petroleum ether. The product was recovered by distillation at 156-157 degrees C / 1-2 mmHg.

The same procedure described in Example 1 was followed with cedar wood and the same results were obtained as Samples 7-10 in the Table 1.

EXAMPLE 6

A series of solutions of vinyltrimethoxysilane (Petrarch Systems) in isopropanol comprising 5% to 35% silane and 2-4 drops titanium acetylacetonate dialkoxide was prepared. Test samples were prepared as in example 1.

In all cases the treated wood showed no fire retardant properties.

TABLE 4

Experimental Summary and Results

| Sample | Concentration (% weight of silane/siloxane in isopropanol) | Time (hr) | Pressure (gauge) (psi) | Penetration (mm) |
|---|---|---|---|---|
| 1 | 5 | 24 | 25 | 4.0 |
| 2 | 12 | 24 | 25 | 4.0 |
| 3 | 21 | 24 | 25 | 4.0 |
| 4 | 35 | 24 | 25 | 4.0 |

Changes may be made in the elements of the compositions or in the steps or the sequence of steps of the methods described herein without departing from the spirit and the scope of the invention as defined in the following claims.

What is claimed is:

1. A method for reducing the combustibility and increasing the water resistance of a compatible combustible material comprising:

treating the compatible combustible material with an effective amount of a fire retardant composition comprising a silane or a siloxane or combination thereof, wherein the silane has the general formula:

wherein the siloxane has the general formula:

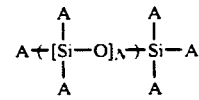

wherein Si is silicon; O is oxygen; n is a positive integer; and A is selected from the group consisting essentially of H, R, X, or Y wherein H is a hydrogen atom;

R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

X is selected from a group consisting essentially of a halogen, hydroxyl group, RO group wherein O is hydrogen, RNR or RNG wherein N is nitrogen, or carboxylic group; and Y is selected from a group consisting essentially of an alkyl group containing from about 1 to about 30 carbon atoms, an alkenyl group, an aryl group, a cycloalkyl group, a cycloalkenyl group, an arylalkyl group, an arylalkeny group, or any substituted group thereof, wherein the cyclo substituent contains from about 4 to about 8 carbon atoms, the aklyl substituent contains up to about 8 carbon atoms and the alkeny substituent contains up to about 8 carbon atoms, wherein Y is substituted with at least one bromine atom or at least one iodine atom, with the proviso that at least one A is X, and at least one A is Y in the composition and the Y group is connected to a silicon atom of the silane or siloxane formula by a carbon atom, and wherein the silicon fire retardant composition containing moiety is substantially chemically bonded to the compatible combustible material and the Y group is substantially chemically bonded to the silicon moiety whereby the Y group substantially cannot be removed from the silicon moiety by water washing.

2. The method of claim 1 wherein the compatible combustible material comprises a cellulose containing material.

3. The method of claim 1 wherein the compatible combustible material comprises wood.

4. The method of claim 1 wherein the compatible combustible material comprises leather.

5. The method of claim 1 further comprising treating the material with the composition with a sufficient pressure exceeding atmospheric pressure.

6. The method of claim 1 further comprising treating the material with the composition with a sufficient pressure of less than atmospheric pressure.

7. The method of claim 1 wherein the composition further comprises an effective amount of a medium.

8. The method of claim 7 wherein the silane, siloxane or combination thereof comprises an amount in a range from about one percent (1%) to about fifty percent (50%) by weight of the composition.

9. The method of claim 7 wherein the silane, siloxane or combination thereof comprises an amount in a range from about five percent (5%) to about forty (40%) by weight of the composition.

10. The method of claim 1 wherein the composition further comprises an effective amount of a catalyst capable of enhancing the ability of the composition to chemically attach to the material.

11. The method of claim 10 wherein the catalyst is a soluble metal catalyst.

12. The method of claim 10 wherein the catalyst is a transesterification catalyst.

13. The method of claim 10 wherein the catalyst is an esterification catalyst.

14. The method of claim 10 wherein the catalyst comprises an amount in a range from about one-tenth of one percent (0.1%) to about twenty-five (25%) by weight of the silane, siloxane or combination thereof.

15. The method of claim 10 wherein the catalyst comprises an amount in a range from about one-tenth of one percent (0.1%) to about five percent (5%) by weight of the silane, siloxane or combination thereof.

16. The method of claim 1 wherein the composition comprises 1,2-dibromoethyltrimethoxysilane.

17. The method of claim 1 wherein the composition comprises 1,3,3-tribromopropyltrimethoxysilane.

18. The method of claim 1 wherein the composition comprises 1,3,3,3-tetrabromopropyltrimethoxysilane.

19. A method for reducing the combustibility and increasing the water resistance of a compatible combustible material comprising:
treating the compatible combustible material with an effective amount of a fire retardant composition comprising a silane or a siloxane or combination thereof,
wherein the silane has the general formula:

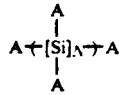

wherein the siloxane has the general formula:

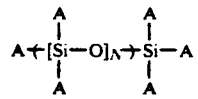

wherein Si is silicon; O is oxygen; n is a positive integer; and A is selected from the group consisting essentially of H, R, X, or Q wherein
H is a hydrogen atom;
R is selected from the group consisting essentially of an alkyl group containing from about 1 to about 30 carbon atoms, an alkenyl group, an aryl group, a cycloalkyl group, a cycloalkeny group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;

x is selected from a group consisting essentially of a halogen, hydroxyl group, RO group wherein O is oxygen, RNR or RNH wherein N is nitrogen, or carboxylic group; and Q is selected from a group consisting essentially of an alkyl group containing from about 1 to about 30 carbon atoms, an alkeny group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms, wherein Q is substituted with at least one $-EH_xR_b$ group, wherein when $x+b=1$, then E is $(E)_m$ wherein m is an integer of 1-5 and E is sulfur or selenium, when $x+b=2$, then E is aluminum, phosphorus or arsenic, and when $x+b=3$, then E is silicon, germanium, or tin, with the proviso that at least one A is X, and at least one A is Q in the composition, wherein the Q group is attached to a silicon atom in the silane or siloxane formula by a carbon atom, and wherein the silicon fire retardant composition containing moiety is substantially chemically bonded to the compatible combustible material and the Y group is substantially chemically bonded to the silicon moiety whereby the Y group substantially cannot be removed from the silicon moiety by water washing.

20. The method of claim 19 wherein the compatible combustible material comprises a cellulose containing material.

21. The method of claim 19 wherein the compatible combustible material comprises leather.

22. The method of claim 19 wherein the compatible combustible material comprises wood.

23. The method of claim 19 further comprising treating the material with the composition with a sufficient pressure exceeding atmospheric pressure.

24. The method of claim 19 further comprising treating the material with the composition with a sufficient pressure of less than atmospheric pressure.

25. The method of claim 19 wherein the composition further comprises an effective amount of a medium.

26. The method of claim 25 wherein the silane, siloxane or combination thereof comprises an amount in a range from about one percent (1%) to about fifty percent (50%) by weight of the composition.

27. The method of claim 25 wherein the silane, siloxane or combination thereof comprises an amount in a range from about five percent (5%) to about forty (40%) by weight of the composition.

28. The method of claim 19 wherein the composition further comprises an effective amount of a catalyst capable of increasing rate of chemical attachment of the composition to the material.

29. The method of claim 28 wherein the catalyst is a soluble metal catalyst.

30. The method of claim 28 wherein the catalyst is a transesterification catalyst.

31. The method of claim 28 wherein the catalyst is an esterification catalyst.

32. The method of claim 28 wherein the catalyst comprises an amount in a range from about one-tenth of one percent (0.1%) to about twenty-five (25%) by weight of the silane, siloxane or combination thereof.

33. The method of claim 28 wherein the catalyst comprises an amount in a range from about one-tenth of one percent (0.1%) to about five percent (5%) by weight of the silane, siloxane or combination thereof.

34. The method of claim 19 wherein the composition comprises 2-(diphenylphosphino)ethyltrimethoxysilane.

35. The method of claim 19 wherein the composition comprises (4-phenylthiobutyl)trimethoxysilane.

36. A method for reducing the combustibility and increasing the water resistance of a compatible combustible material comprising:

treating the compatible combustible material with an effective amount of a fire retardant composition comprising a silane or a siloxane or combination thereof, wherein the silane has the general formula:

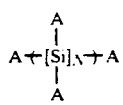

wherein the siloxane has the general formula:

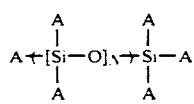

wherein Si is silicon; O is oxygen; n is a positive integer; and A is selected from the group consisting essentially of H, R, X, or D wherein
H is a hydrogen atom;
R is selected from the group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms;
X is selected from a group consisting essentially of a halogen, hydroxyl group, RO group wherein O is oxygen, RNR or RNG wherein N is nitrogen, or carboxylic group; and
D is selected from a group consisting essentially of an alkyl group containing from about 1 to about 30 carbon atoms, an alkenyl group, an aryl group, a cycloalkyl group, a cycloalkenyl group, an arylalkyl group, an arylalkenyl group, or any substituted group thereof, wherein the cyclo substituent contains from about 4 to about 8 carbon atoms, the alkyl substituent contains up to about 8 carbon atoms and the alkenyl substituent contains up to about 8 carbon atoms, wherein D is substituted with at least one moiety comprising an element capable of forming a covalent bond with carbon having an average bond energy of 72 kcal/mol or less, with the proviso that at least one A is X, and at least one A is D in the composition, wherein the D group is connected to a silicon in the silane or the siloxane formula by a carbon atom, and wherein the silicon fire retardant composition containing moiety is substantially chemically bonded to the compatible combustible material and the Y group is substantially chemically bonded to the silicon moiety whereby the Y group substantially cannot be removed from the silicon moiety by water washing.

37. The method of claim 36 wherein the compatible combustible material comprises a cellulose containing material.

38. The method of claim 36 wherein the compatible combustible material comprises wood.

39. The method of claim 36 wherein the compatible combustible material comprises leather.

40. The method of claim 36 further comprising treating the material with the composition with a sufficient pressure extending atmospheric pressure.

41. The method of claim 36 further comprising treating the material with the composition with a sufficient pressure of less than atmospheric pressure.

42. The method of claim 36 wherein the composition further comprises an effective amount of a medium.

43. The method of claim 42 wherein the silane, siloxane or combination thereof comprises an amount in a range from about one percent (1%) to about fifty percent (50%) by weight of the composition.

44. The method of claim 42 wherein the silane, siloxane or combination thereof comprises an amount in a range from about five percent (5) to about forty (40%) by weight of the composition.

45. The method of claim 42 wherein the composition further comprises an effective amount of a catalyst capable of increasing rate of chemical attachment of the composition to the material.

46. The method of claim 42 wherein the catalyst is a soluble metal catalyst.

47. The method of claim 46 wherein the catalyst is a transesterification catalyst.

48. The method of claim 46 wherein the catalyst is an esterification catalyst.

49. The method of claim 46 wherein the catalyst comprises an amount in a range from about one-tenth of one percent (0.1%) to about twenty-five (25%) by weight of the silane, siloxane or combination thereof.

50. The method of claim 46 wherein the catalyst comprises an amount in a range from about one-tenth of one percent (0.1%) to about five percent (5%) by weight of the silane, siloxane or combination thereof.

51. The method of claim 36 wherein the composition comprises 2-(diphenylphosphino)ethyltrimethoxysilane.

52. The method of claim 36 wherein the composition comprises (4-phenylthiobutyl)trimethoxysilane.

53. The method of claim 36 wherein the composition comprises 1,2-dibromoethyltrimethoxysilane.

54. The method of claim 36 wherein the composition comprises 1,3,3-tribromopropyltrimethoxysilane.

55. The method of claim 36 wherein the composition comprises 1,3,3,3-tetrabromopropyltrimethoxysilane.

* * * * *

UNITED STATES PATENT AND TRADEMARK OFFICE
CERTIFICATE OF CORRECTION

PATENT NO. : 5,120,581
DATED : June 9, 1992
INVENTOR(S) : Dean E. Brunken, Arnulf P. Hagen It is certified that error appears in the above-identified patent and that said Letters Patent is hereby corrected as shown below:

Column 1, line 9, please delete "," after U.S. Ser. No. 07/421,176--.

Column 1, line 11, please delete "," after MATERIALS--.

Column 3, line 14, please delete the word " A"' " and substitute therefore the word --A"--.

Column 5, line 17, please delete the equation "x+b2" and substitute therefore the equation --x+b=2--.

Column 5, line 21, please delete the equation "x+r 2" and substitute therefore the equation --x+r=2--.

Column 7, line 34, after the word into, please insert the word --a--.

UNITED STATES PATENT AND TRADEMARK OFFICE
CERTIFICATE OF CORRECTION

PATENT NO. : 5,120,581

DATED : June 9, 1992

INVENTOR(S) : Dean E. Brunken, Arnulf P. Hagen

It is certified that error appears in the above-identified patent and that said Letters Patent is hereby corrected as shown below:

Column 7, line 62, please delete "." after 0°C--.

Column 8, line 8, please delete the word "Table ' " and substitute therefore the word --Table 1--".

Column 10, line 36, please delete the word "hydrogen" and substitute therefore the word --oxygen--.

Column 10, line 36, please delete the symbol "RNG" and substitute therefore the symbol --RNH--.

Column 10, line 42, please delete the word "arylalkeny and substitute therefore the word --arylalkenyl--.

Column 10, line 46, please delete the word "alkeny" and substitute therefore the word --alkenyl--.

UNITED STATES PATENT AND TRADEMARK OFFICE
CERTIFICATE OF CORRECTION

PATENT NO. :   5,120,581

DATED      :   June 9, 1992

INVENTOR(S) :  Dean E. Brunken, Arnulf P. Hagen

It is certified that error appears in the above-identified patent and that said Letters Patent is hereby corrected as shown below:

Column 11, line 11, please delete the word "(!%)" and substitute therefore the word --(1%)--.

Column 12, line 1, please delete the word "cycloalkeny" and substitute therefore the word --cycloalkenyl--.

Column 12, line 14, please delete the word "alkeny" and substitute therefore the word --alkenyl--.

Column 12, line 19, please delete the word "aklyl" and substitute therefore the word --alkyl--.

Column 13, line 56, please delete the symbol "RNG" and substitute therefore the symbol --RNH--.

Column 13, line 65, please delete the word "aklyl" and substitute therefore the word --alkyl--.

UNITED STATES PATENT AND TRADEMARK OFFICE
CERTIFICATE OF CORRECTION

PATENT NO. :     5,120,581

DATED      :     June 9, 1992

INVENTOR(S) :    Dean E. Brunken, Arnulf P. Hagen

It is certified that error appears in the above-identified patent and that said Letters Patent is hereby corrected as shown below:

```
Column 14, line 24, please delete
the word "extending" and substitute
therefore the word --exceeding--.

Column 14, line 24, please delete
the word  "(5)"  and substitute
therefore the word --(5%)--.
```

Signed and Sealed this

Twenty-first Day of December, 1993

BRUCE LEHMAN

Attest:

*Attesting Officer*    *Commissioner of Patents and Trademarks*